June 20, 1950  H. V. HOLMAN  2,512,528
PROTECTIVE DEVICE FOR CLAMP SCREWS OR THE LIKE
Filed Dec. 8, 1945
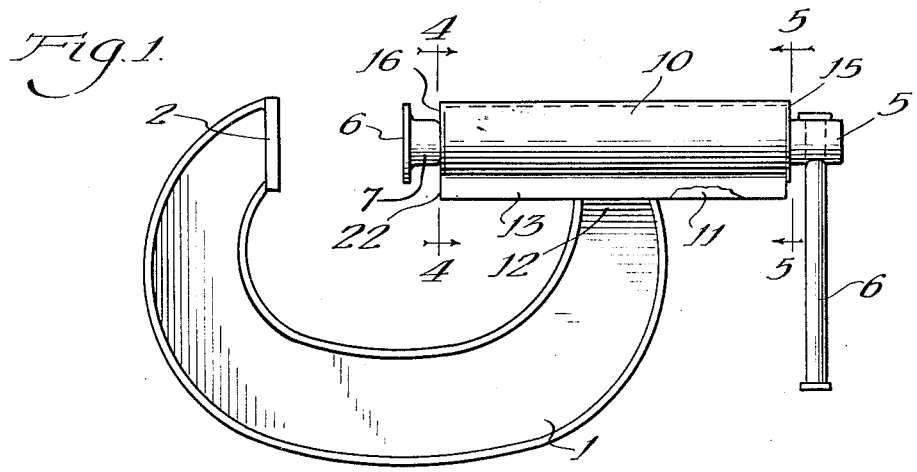
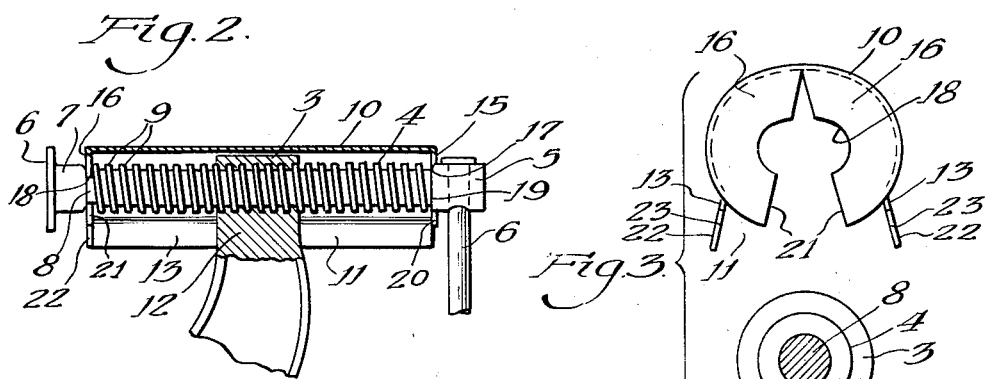
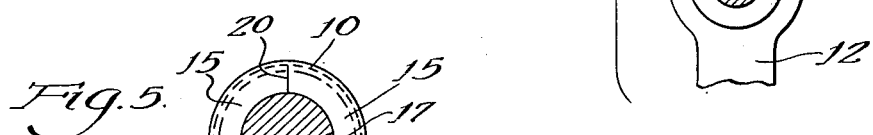
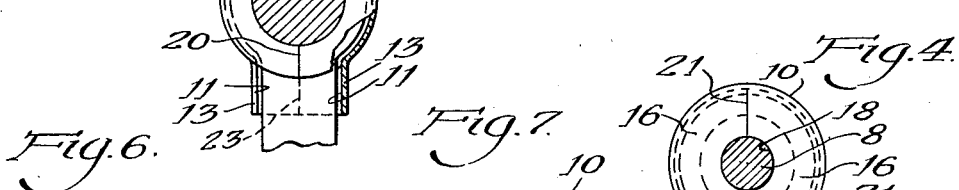
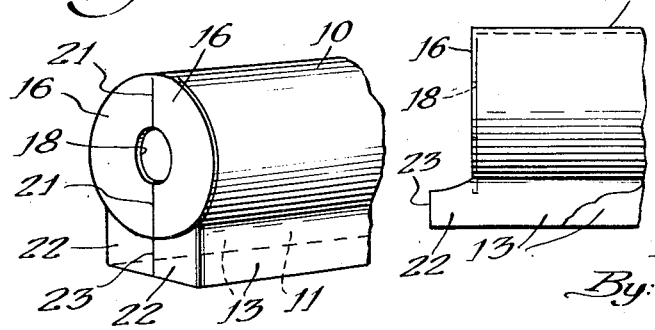
Inventor:
Harry V. Holman
By Louis A. Bisson,
Attorney Patented June 20, 1950

2,512,528

UNITED STATES PATENT OFFICE 2,512,528

PROTECTIVE DEVICE FOR CLAMP SCREWS
OR THE LIKE

Harry V. Holman, Evanston, Ill.

Application December 8, 1945, Serial No. 633,615

3 Claims. (Cl. 113—99)

The present invention relates to guards, shields, or protective means for operative parts of tools such as the screw of a clamping device, and is an improvement on the guard, shield, or protective means disclosed in my Patent No. 2,221,326 issued November 12, 1940.

When electro-welding, or torch-welding, or the like, pieces of work that may be or are held in such devices as clamps or the like, having a screw element for holding the piece of work in place while welding, some of the spattering or splattering or spluttering of the molten metal will strike and freeze upon the clamping screw or the like, thus rendering it useless. To avoid this condition, guards or shields have been devised to intercept such spattering or splattering or spluttering and prevent their reaching or contacting the screw or any other operative part of the holding tool.

In one form of device the guard or shield which is generally of tubular form with a slot along a side thereof to partly enclose the screw and the clamp nut in which the screw operates, is built in with the tool so as to become a permanent operative part thereof. One end of the guard or shield is rotatively connected to the handle-end of the screw and the other end of the guard or shield constitutes a movable clamping jaw part of the clamp.

In such a structure the work force or power is transmitted through the guard or shield as one of the elements of the power train. That has the disadvantage of buckling under strong force and rendering the tool wholly inoperative and useless, especially when the body of the guard or shield, formed from sheet metal, has been dented or similarly damaged. Should it be desired in such cases to remove the guard or shield, the tool must be destroyed to obtain such result.

In the device shown in my aforesaid patent, the shield or guard is assembled in place when the screw is being assembled, and if a replacing of the shield or guard is to be effected, it is necessary to disassemble the screw from the clamp device and to reassemble it with a replacing shield or guard.

An object of the present invention is to provide a novel shield or guard which may be placed on the clamping device after such device has been fully assembled and without the necessity of removing the screw from the clamp, by making the shield or guard of sheet metal and in sufficiently open form to permit the shield or guard to be placed upon the tool and around the screw which it is intended to protect, and then pressing parts of the shield or guard together to cause it to be connected to or associated with the screw, and means are provided for holding the shield or guard in that relation in its use with the tool. The shield or guard is merely carried by the screw without in any way affecting the operation of the tool and has extending means, as skirts, and wings, to extend at substantial distances beyond the locale of the screw or other element to be protected by the shield or guard from access of spattering or splattering or spluttering from the welding locus.

Other objects, advantages, capabilities, features, and the like are comprehended by the invention as will later appear, and as are inherently possessed by the invention.

Referring briefly to the drawings:

Fig. 1 is a side or elevational view of a device showing by way of illustration the application of the invention;

Fig. 2 is a fragmentary longitudinal sectional view taken in a vertical plane through part of the device shown in Fig. 1;

Fig. 3 is a transverse sectional view of the guard or shield and a device to which it is applicable in a stage of assembly;

Figs. 4 and 5 are transverse sectional views taken in planes represented by lines 4—4 and 5—5 in Fig. 1 of the drawings;

Fig. 6 is a fragmentary prospective view of the guard or shield in its final stage of assembly; and, Fig. 7 is a fragmentary longitudinal sectional view in a pre-final stage of assembly.

Referring more in detail to the drawings, the embodiment selected to illustrate the invention is shown in connection with a C-type of clamp, but it is to be understood that the invention is applicable to other forms of clamps or similar tools. The clamp shown comprises a body 1 having at an end a stationary or dead clamping jaw 2 and at the other end a nut 3 through which operates a clamping screw 4. The rear or outer end of the screw 4 has a head 5 which may have a transverse hole for the reception of a handle 6 by which the screw may be manually operated to effect a clamping or unclamping of the screw 4. At the other or forward end of the screw 4 is connected a movable or live clamping jaw 6, of suitable form which may have a hub portion 7 carried by a neck portion 8 at the front end of the threaded portion 9 of the screw 4.

The protecting guard or shield comprises an elongated hollow body or shell 10 of sheet or like material, such as sheet metal so bent, curved, or otherwise formed as to mainly partly encompass and house the screw 4 and the nut 3, with an elongated opening 11 along a side of the shell 10 for the extension therethrough of the neck 12 of or from the nut 3 for the free longitudinal relative movement of the shell 10 and the neck 12. At the sides of the elongated opening 11 are provided skirt or flange portions 13 which are secantal extensions of the body or shell 10 so as to extend a substantial distance along the sides of the neck portion 12 of the nut 3. While the body or shell 10 is in a more or less rounded or cylindrical form, as C-shaped in cross-section, it will be understood that it may have any cross-sectional shape desired, such as polygonal, non-circular, etc.

At the ends of the body or shell 10 are provided collars or flanges 15 and 16, which are preferably integral parts of the shell 10 and formed from the sheet material of which the shell was made, the collars 15 and 16 being composed of arc or C-shaped segments to form a C-shaped unit, as shown, to have holes or openings 17 and 18, the sizes of which are such that the opening 17 will receive the inner-end portion 19 of the head 5, and the opening 18 will receive the neck 8 of the screw 4 at the clamping end of said screw. See Fig. 2. The collar or flange 15 has ends 20, 20 and the collar or flange 16 has ends 21, 21 which are apposable or capable of being brought together and suitably connected or joined, as by spot or point welding so that the head portion 19 and the neck 8 will fit, closely but rotatively, in the holes or openings 17 and 18. While the collars or flanges 15 and 16 are in the main integral with the body or shell 1, as shown, it will be seen that the side flanges or skirts 13 at the forward or inner end of the body or shell 10 near the clamp hub 7, have extensions or wings 22 which may be bent from the form shown in Fig. 7 to the form shown in Figs. 4, 5 and 6, so that the ends 23 of these wings may come together and be connected or joined, as by spot or point welding, the wings 22 thus forming a skirted continuation of the collar or flange 16. The ends 20, 21 and 23 may abut or may overlap and the mode of connecting them together may be by "tacking" by a small weld or by a mechanical clamping in any suitable way or manner and so that they may not be too easily or readily removed from the clamp device. While the collars or flanges 15 and 16 are shown to be composed of a set of two segments, they may be in the form of an aggregate of tapered tongues bent from the body of the shell 10 into planes transverse to the length of the shell and in abutting or overlapping relation more or less, if necessary, whereby the bent parts may be tacked together by welding as above indicated.

The guard or shell is made from sheet material, such as sheet metal, which, by way of example, may be of eighteen or twenty gauge material or the like. Such sheet preferably is first punched and slitted or cut to form the wing-pieces 22 and the collar portions 15 and 16 with cut-outs to form the eventual holes or openings 17 and 18 after the piece has been shaped in a suitable machine such as a die press or the like. In the first stage of shaping, the sheet is formed generally in a rounded shape as shown in Fig. 3 with the segments of the end flanges 15 and 16 extending inwardly from the ends of the body or shell 10, but with the ends 20 and 23 of the segments of these flanges spaced apart as shown in Fig. 3, such spacing apart at a pair of the ends 20 being as great or greater than the diameter of the head 5 and the neck 8 respectively for the segments of the collars or flanges 15 and 16 to afford for the later free passage of the latter over the head 5 and neck 8. At the same time the skirts or flanges 13 are bent from the curved wall of the body 10 to substantially the form or positions shown in Fig. 3, and the wings 22 will extend lengthwise of the skirts 13, as shown in Fig. 7. The guard or shield in this form is of what may be termed the open condition of the guard or shield preparatory to applying it in place on the tool or machine to protect the screw or the like.

The guard or shield is then applied in place, as by simply pushing or the like, so that the segments of the collar or flange 15 will be around the end portion 19 of the head 5 and the segments of the collar or flange part 16 will be around the neck 8 at the forward end of the screw 4, (see Fig. 2) the width of the wider spaces between the ends 20 of the collar or flange 15 and between the ends 21 of the collar or flange 16 being such as to permit the free passing of such ends by said head end 19 and said neck 8 for them to be received in the holes or openings 17 and 18 respectively.

The body or shell 10 is then pressed or squeezed laterally to force the ends 20 of the collar or flange segments 15 together either in abutting or overlapping relation for such ends 20 to be connected together, as by spot or point welding or otherwise, and to force the ends 21 of the collar or flange segments 16 together either in abutting or overlapping relation for such ends 21 to be connected together, as by spot or point welding or otherwise, whereby the end portion 19 of the head 5 fits rotatably in the hole 17 of the collar or flange 15, and the neck 8 fits in the hole 18 of the collar or flange 16, the latter flange being located between the end of the screw 4 and the hub 7 of the clamping jaw 6 so as to prevent longitudinal movement or play of the shell 10.

As the sides of body or shell 10 are forced toward each other, as above described, the skirts or flanges 13, 13 will be moved close to the neck 12 of the nut 3 so as to define an elongated slot or channel between such flanges 13 to afford a relative longitudinal movement of the shell 10 together with the screw 4, and the nut 3 and its neck 12, when the screw is operated or turned.

At the same time the wings 22 are bent inwardly for their ends 23 to be abutted or overlapped and connected together as by spot or point welding or otherwise, as desired.

From the above it will be seen that the guard or shield is simple and is readily applied. It may, if desired, be supplied completely assembled on the clamp or the like, as by applying the guard or shield to the screw of the clamp as the screw is being assembled in place, or it may be supplied in an open or "clam-shell" form to be applied after the screw has been assembled in the clamping device, and then closed by pressing or even hammering it over and around the head and screw of any clamp of corresponding size dimensions. When assembled it comprises a more or less cylindrical or similar body or shell 10 for practically completely enclosing the screw 4 and part of the head 5, as also of the neck 8, of the screw 4, except for small openings 17 and 18 at the ends for the extension of the head and neck portions 5 and 8 of the screw 4, which portions act as bearings for the end portions, as the collars or flanges 15 and 16, of the shell 10, and the slot or channel 11 longitudinally along a side of the shell 10 for relative movement of the nut 3 and the nut neck 12 of the clamp 1 along the screw threads of the screw 4. Such structure offers and affords protection to the screw from the spattering or splattering or spluttering from the locus of welding, and also from any accidental contact with the electrode or torch, and also further offers and affords protection from dirt accumulating on the threads. The shield of the present invention does not perform any part of the work of the clamp, nor does it in any way interfere with the ordinary and usual use of the clamp or other tool with which it may be associated. If the shield should become damaged in service, it can be removed from the clamp entirely, and can be replaced by another without affecting the proper service and utility of the clamp.

The shield is carried and held in position on the clamp screw by the ends, as collars or flanges 15 and 16, formed to bear on the body of the screw, such as its head 5 at one end and its neck 8 at the other end thereof, such end portions having openings 17 and 18 of such size for a close connection of such end portions with the head and neck portions 5 and 8 of the screw, as described above, the forward end portion 16 being located between the forward end of the screw 4 and the hub 7 of the movable clamping jaw 6 so as to maintain a constant relation of the shell 10 relative to the screw 4, especially with respect to the threaded portion of the screw whereby such threads are always shielded and guarded. The wings 22 provided at the forward end near the movable clamping jaw 6 and at the neck 8 of the screw are for guarding against the passage of the spattering or splattering or spluttering toward the threads of the screw in a more or less longitudinal direction relative to the general length of the screw. The skirts 13 at the sides extend a substantial distance from the body of the shell 10, at the sides of the channel for the passage of the neck 12 of the nut 3, to also prevent any angular projection of the spattering or splattering or spluttering, as also dirt and heat, and the like, from the locus of the welding toward the screw, or from other sources. The ends 20 and 21 of the collars or flanges 15 and 16, as also the ends 23 of the wings 22 may be, if desired, not welded together, but have any suitable means for facilely connecting or attaching them together so that they may be held in place and relation as desired, and may be as easily disconnected or detached for removing the shell or shield from the tool.

While I have herein described and upon the drawings shown in illustrative embodiment of the invention, it is to be understood that the invention is not limited thereto but comprehends other constructions, details, arrangements of parts, features, and the like, without departing from the spirit of the invention.

Having thus disclosed the invention,

I claim:

1. A guard of the character disclosed comprising a tubular body adapted to surround a device to be guarded, said body having circumferentially-spaced, longitudinally-extending edges defining therebetween an elongated slot at a side of said body, integral end portions extending transversely of said body and each comprising sections having opposed edges provided with notches adapted to cooperate to form a hole which surrounds an operative part of the device to be guarded, said body including spaced side flanges extending outwardly from said longitudinal edges at opposite sides of said elongated slot to form a channel extending the length of the body, said side flanges terminating in end portions turned inwardly in a direction substantially normal to said side flanges with the inner ends of said turned-in portions adapted to abut, said side flanges and their turned-in end portions providing walls which function to resist the entry of foreign matter through the elongated slot.

2. A guard as defined in claim 1, wherein the turned-in end portions of the side flanges are in the same planes as those of the integral end portions of the tubular body.

3. A guard as defined in claim 1, wherein each section of each integral end portion is semicircular, and in which said notches are semicircular, said notches, when the opposed edges are in abutting relation, constituting a circular hole.

HARRY V. HOLMAN.

REFERENCES CITED

The following references are of record in the file of this patent:

UNITED STATES PATENTS

| Number | Name | Date |
|---|---|---|
| 526,033 | Griswold | Sept. 18, 1894 |
| 1,268,775 | Stanger | June 4, 1918 |
| 1,562,482 | Woernle | Nov. 24, 1925 |
| 2,205,674 | Schroeder | June 25, 1940 |
| 2,221,326 | Holman | Nov. 12, 1940 |